United States Patent [19]

Bogdanov

[11] 3,762,998

[45] Oct. 2, 1973

[54] CULTIVATION OF LACTOBACILLUS BULGARICUS TO PRODUCE A RIBONUCLEOPROTEID

[75] Inventor: Ivan G. Bogdanov, Sofia, Bulgaria

[73] Assignee: Texim E.E.E., Sofia, Bulgaria

[22] Filed: July 6, 1970

[21] Appl. No.: 56,132

Related U.S. Application Data

[63] Continuation of Ser. No. 805,079, Jan. 28, 1969, abandoned, which is a continuation-in-part of Ser. No. 552,552, May 24, 1966, abandoned.

[30] Foreign Application Priority Data

June 1, 1965 Bulgaria .................................... 5091
Mar. 7, 1966 Bulgaria ..................................... P-3

[52] U.S. Cl. ................................. 424/28 N, 195/96
[51] Int. Cl. ............................................ A61f 13/00
[58] Field of Search ...................... 195/80, 96, 28 N; 424/116, 123

[56] References Cited

OTHER PUBLICATIONS

Bogdanov et al., Acta Unio Internationallis Contra Cancrum, Vol. 20, 1964, pp. 293–294.

Kronberg et al., Biochemica Biophyrica Acta, Vol. 40, Sept. 1960, pp. 410–417.

Dixon et al., "Enzymes," 1958, Academic Press; New York, pp. 42–50.

*Primary Examiner*—Joseph M. Golian
*Attorney*—Christen and Sabol

[57] ABSTRACT

The process of manufacturing an active anticarcinogen ribonucleoproteid wherein ribonucleic acid is the bearer of the anticancer activity while the protein acts as its protector and activator, produced by cultivating a micro-organism of the Lactobacillus genus.

4 Claims, 3 Drawing Figures

| SPECIES | | | | LACTOBACILLUS BULGARICUS | | | | LACT. CASEI | LACT. HELVE- TICUS | LACT. ACIDO- PHILUS |
|---|---|---|---|---|---|---|---|---|---|---|
| VARIANT | | | | LB-51 | LB-87 | LB-93 | LB-104 | LC-17 | LH-31 | LA-43 |
| 1 | MICROSCOPIC OBSERVATION CULTURE MEDIUM AT 37°C, FOR 24 H | 1 | BACILLUS | +5-19μ | +5-19μ | +7-12μ | +5-15μ | +5-8μ | +5-12μ | +4-15μ |
| | | 2 | MOTILITY | − | − | − | − | − | − | − |
| | | 3 | ENDOSPORE | − | − | − | − | − | − | − |
| | | 4 | SPORANGIUM | − | − | − | − | − | − | − |
| | | 5 | GRAM STAINING | + | + | + | + | + | + | + |
| 2 | GELATIN STAB. | 6 | LIQUEFACTION | − | − | − | − | − | − | − |
| 3 | MILN CULTURE CULTURED AT 37°C | 7 | COAGULATION | + | + | + | + | + | + | + |
| | | | LITMUS MILN | R | R | R | R | R | R | R |
| 4 | FAVORABLE GROWTH CULTURE | 8 | CULTURE MEDIUM N | II | II | II | II | II | II | II |
| 5 | GLUCOSE BROTH CULTURE AT 37°C | 9 | TURBIDITY | − | + | + | + | + | + | + |
| | | | SEDIMENT | + | + | + | + | + | + | + |
| 6 | COLONIES ON GLUCOSE AGAR CULTURED AT 37°C | 10 | FORM: DESCRIBED IN TEXT | | | | | | | |
| 7 | GLUCOSE AGAR SLANT CULTURED AT 37°C | 11 | GROWTH | + | ++ | + | + | +++ | + | ++ |
| 8 | GLUCOSE STAB: CULTURED AT 37°C | 12 | GROWTH | ++ | +++ | ++ | ++ | ++ | ++ | ++ |
| 9 | PHYSIOLOGICAL PROPERTIES | 13 | REDUCTION OF NITRATES | | | | | | | |
| | | 14 | CATALASE | − | − | − | − | − | − | − |
| | | 15 | GROWING TEMPERATURE 23°-37° | | | | | | | |
| | | | 25°-45° | | | | | + | + | + | + |
| | | | 30°-50° | + | + | + | | | | |
| | | | 40°-60° | | | | | | | |
| | | 16 | OPTIMUM TEMPERATURE FOR GROWTH 25°-37° | | | | | | | |
| | | | 30°-40° | | | | | | + | + | + |
| | | | 32°-45° | + | | + | + | | | |
| | | | 35°-50° | | + | | | | | |
| | | 17 | OXYGEN REQUIREMENT FAC. ANAEROB. | + | + | + | + | + | + | + |
| | | 18 | OPTICAL ROTATION OF LACTIC ACID | D(−) | D(−) | D(−) | D(−) | L(+) | DL | DL− |
| | | 19 | AVAILABILITY OF SUGARS GLUCOSE | + | + | + | + | + | + | + |
| | | | MANNOSE | + | + | + | + | + | − | − |
| | | | SACCHAROSE | + | − | − | − | + | −• | + |
| | | | LACTOSE | + | + | + | + | + | + | + |
| | | | MALTOSE | + | − | − | − | + | + | + |
| | | | INULIN | − | − | − | − | − | − | − |
| | | | MELECITOSE | − | − | − | − | + | − | − |
| | | | AMIDON | − | − | − | − | − | − | − |
| | | 20 | AMIN ACID REQUIREMENT L-ASPARAGINE | + | + | + | + | + | + | + |
| | | | L-HYPTOPHANE | + | + | + | + | + | + | + |
| | | 21 | VITAMINE REQUIREMENT FACTOR BAC. BULGARICUS | + | + | + | + | + | + | + |

Fig 1

CULTIVATION OF LACTOBACILLUS BULGARICUS TO PRODUCE A RIBONUCLEOPROTEID

This application is continuation of application Ser. No. 305,079 filed Jan. 28, 1959 now abandoned, which application in turn is a a continuation-in-part of application Ser. No. 552,552 filed May 24, 1966 now abandoned The invention relates to a process for the manufacture of an active anticarcinogen.

Hitherto, a number of synthetic products, various animal extracts and plant extracts as well as products deriving from microbes, have been put forward as anticarcinogens. However, they are unsatisfactory since they affect not only the cancerous cells, but also damage normal tissue.

According to the present invention, there is provided a process for the manufacture of an active anticarcinogen which comprises the steps of cultivating a microorganism of the Lactobacillus type, which microorganism produces the anticarcinogen in its cultures where it is accumulated in the bacterial cells, and extracting and purifying the anticarcinogen.

The process comprises the steps of cultivating the micro-organism of the Lactobacillus genus in an aqueous nutrient medium containing sources of nitrogen, carbon and phosphorus which are assimilated in anaerobic conditions at temperatures between 35°C. to 45°C. for 18 to 24 hours. The micro-organism produces the anti-cancer substance in its cultures, where it is accumulated in the bacterial cells. The cells are extracted by phenol and/or water and the anti-carcinogen is purified in the extracts through precipitation with water-soluble organic solvents, acids or salts.

The active anticancer substance thus produced is high-molecular ribonucleoproteid, wherein the bearer of the anticancer activity is the ribonucleic acid, while the protein ingredient plays the part of a protector and activator of the anticancer effect.

The anticarcinogen obtained by the process of the present invention is totally different in its biological effect and in its chemical nature from any of the anticarcinogens hitherto known, and acts selectively against the cancerous cells.

The new anticarcinogen has the effect of inhibiting tumors as well as at the same time having a strong necrotizing action on tumors. An intravenous injection of the anticarcinogen can lead to the total destruction even of very large tumors and has completely healed nearly half the animals treated, whereas the other anticarcinogens thus far known do not have the effect of inhibiting the tumor except if applied immediately after implantation of the latter.

The new anticarcinogen at the same time stimulates the resistance of the infected organism.

In cancerous tissues, changes have been observed as early as eight hours after intravenous injection of the new anticarcinogen. Microscopic studies have demonstrated that the substance has a selective action on the cancerous cells and does not effect the blood vessels and other normal tissue at all. The substance stimulates the bone marrow and its haematopoiesis, while the other known anticarcinogens have an inhibiting action in this direction.

All these facts indicate that the proposed new anticarcinogen is substantially different from the anticarcinogens thus far known, and in fact its chemical nature confirms this.

In the accompanying drawings:

FIG. 1 is a table setting out the properties of various strains of the Lactobaciuus species;

Figure 2:
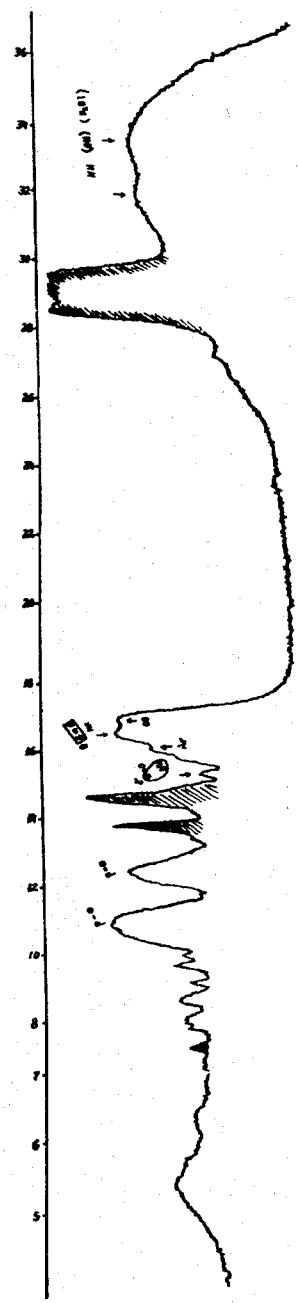
FIG. 2 is an ultra-violet spectrum of the ribonucleic acid present in the anticarcinogen of the present invention.

From the beginning of our anti-cancer research, the anticarcinogenic properties of various micro-organisms have been a subject of investigation. Cultures and extracts of these micro-organism have been intravenously injected into mice carrying well-developed intradermally implanted 180 sarcomas (Krocker sarcomas). The anticarcinogentic effect has been observed in substances obtained from cultures of bacilli of the Lactobacillus type. A marked effect has been observed with Lactobacillus bulgaricus, strain 51, isolated from curdled milk (yogurt). Between 24 and 48 hours after the injection of cultures of this strain, there is observed in nearly all the tumors good and clearly defined necrosis, and a few days later about a third of the animals treated are completely cured. A similar phenomenen, although less marked, has been observed in the course of studies on certain other strains of the species Lactobacillus bulgaricus, Lactobacillus casei, Lactobacillus helveticus and Lactobacillus acidophilus.

Lactobacillus bulgaricus LB-51 consists of bacilli having sizes between 5 and 7 microns, being gram-positive, and being arranged in pairs or in chains having lengths in accordance with the nutritive environment. One source of this species is yogurt from which the LB-51 is obtained for incubation in a nutrient fluid.

In the case of liquid cultures, this bacillus forms a marrow-like sediment whilst in agar-bearing environments it forms small fibrous colonies.

Its other biochemical properties are shown in the table of FIG. 1 and are compared there with the properties of other active anticarcinogenic strains of the Lactobacillus species. The microorganism Lactobacillus Bulgaricus - variant Tumoronecroticance 51 has been deposited with the Bulgarian Ministry of National Health and Social Welfare, State Institute for Control of Medicaments, People's Republic of Bulgaria under the code identification of B51-1m/55 and has also been deposited with the American Type Culture Collection, 12301 Parklawn Drive, Rockville, Md., 20852, and is identified thereby as ATCC number 21815.

The morphological and physiological nature of all these active anticarcinogenic strains corresponds with the description given in *Bergey's Manual of Determinative Bacteriology* by Robert S. Breed, 7th edition, but at the same time they have a special characteristic peculiar to themselves and for this reason they are designated "varietas tumoronecroticans." The morphological and biological characteristics of certain active anticarcinogenic strains are indicated in the table of FIG. 1. Obviously, the invention is not limited solely to the aforementioned strains, which simply constitute examples of the invention, but applies in general to all "tumoronecroticans" strains.

The cultivation and accumulation of the anticarcinogen "varietas tumoronecroticans" from bacilli of the Lactobacillus type, depends upon the particular nutritive medium employed. It is possible to use nutritive media containing a variety of alimentary agents. As a source of nitrogen, it is possible to use peptones, meat extracts, maize extracts, soya extracts, yeast extracts, and the like, while as a source of carbon it is possible to use glucose, maltose, lactose, saccharose dextrin, molasses, and the like. As a source of phosphorus, hydrolysates of yeast, phosphates, and the like, may be employed. By way of nutritive substances, it is possible to use at least one member of the various groups forming the source of nitrogen and carbon. It has been discovered that the adding small quantities of inorganic salts, such as the phosphates of sodium and potassium, the sulphates of magnesium and other elements, the anticarcinogenic action is enhanced.

The culture may be prepared in anaerobic conditions, without aeration, at a temperature between 45°C and 35°C for an optimum period of between 18 and 24 hours.

During the course of fermentation, the pH-value of the culture drops to 3.8. Over this period, it is unnecessary to check the pH-value.

During the fermentation period, the anticarcinogen accumulates predominantly in the bacterial cells.

In the case where there is autolysis of the bacterial cells, the anticarcinogenic action is still observed in the liquid of the cultures. The anticarcinogen may be extracted using water, after the destruction of the membranes of the bacterial cells. This have nothing to do with lactic acid, to which latter V. Carminati has attributed an anticarcinogenic action (Boll. Inst. Sieroterap. Milanese 12 : 205–220, 1933).

The anticarcinogen of the present invention has no anti-microbial properties and is totally different from the anti-microbial materials produced by bacilli of the Lactobacillus type and described by Bogdanov (Oeuvres scientifiques de ISUL, Institut de specialisation et perfectionnement des medecins, 2, 1952, 131–139), Wheater, Hirsch, Mattick (Nature 1952, vol. 168, 659) and James Vincent & Co. (J. Bacteriology, 78, 477–84, 1959).

With the completion of fermentation, the anticarcinogen contained in the bacterial cells can be extracted and purified in a variety of ways.

Purification may involve at least one extracting operation and a precipitating operation, which will either be carried out once only or can be carried out several times in different combinations, as indicated by the following scheme:

E - extraction   E - P
P - precipitation   E - P - E
E - P - E - P
E - P - E - P - E - P etc.

1 - The extraction process

The extraction of the anticarcinogen can be effected with the aid of at least one of the solvents from the group consisting of water and phenol. For aqueous extraction, a solid starting material is employed, while for extraction using phenol it is possible to employ aqueous solutions of the anticarcinogen or of the materials containing the latter.

By way of solids which contain the anticarcinogen, we should mention natural bacterial cells, dry degreased bacterial cells, bacterial cells which have been preliminarily extracted to eliminate the ballast materials, and the dry materials obtained as products of extractions and precipitations, described hereinafter.

Aqueous extraction can be carried out by mixing water with the material containing the anticarcinogen. In the case where this material is constituted by bacterial cells, it is necessary for these to be disintegrated using a homogenizer, a colloidal mill, ultrasonic techniques or enzymes such as lysozyme, pepsin or other suitable enzymes. The mixture may be filtered or centrifuged to eliminate the insoluble constituents. The major part of the active anticarcinogen is then left in the aqueous extract. Aqueous extraction is conveniently carried out at a temperature varying between 0°C and 18°C. Preferably, the pH-value of the water is between 4 and 9. A pH-value lower than this may give rise to precipitation while a higher pH-value may render the anticarcinogen inactive. The addition of a plug of phosphate and of 0.01 mols of magnesium sulphate improves aqeuous extraction.

The process of extraction using phenol can be carried out either by extracting solids with 96% phenol or by adding an equal volume of 96% phenol to aqueous solutions or suspensions containing the anticarcinogen. In both cases, after vigorous stirring of the mixture, centrifuging can be carried out to separate the layer of phenol, the insoluble residue and the aqueous layer. The anticarcinogen enters the phenol and its separated out using the procedure described hereinafter. Extraction with phenol can be carried out at a temperature between 4° and 70°C.

2 - The precipitation processes

Precipitation of the anticarcinogen can be achieved by the introduction of various salts, of water-soluble organic solvents and/or of acids. These precipitation processes can be applied to aqueous extracts as well as to phenolic extracts.

Where precipitation is achieved by the addition of various salts, preferably ammonium sulphate, ammonium chloride, sodium sulphate, calcium chloride, barium chloride or magnesium sulphate are used. Where ammonium sulphate is employed, the quantity will depend upon the degree of saturation it is desired to achieve and this may lie between 0.1 and 0.8. The anticarcinogen enters the precipitate. The remainder of the salts in the precipitate may be eliminated by a process such as dialysis, filtration using "Sephadex" or by dissolution, and precipitation can then be repeated using acid.

Where precipitation is carried out using water-soluble organic solvents, methanol, ethanol, acetone, and the like, can be employed. Preferably, between one and three volumes of the solvent are used per volume of the primary solution.

In the case of precipitation using acids, the pH-value will preferably be between 1.5 and 4. In this connection, it is possible to use inorganic acids such as hydrochloric acid, sulphuric acid, or phosphoric acid, and organic acids such as acetic acid, and oxalic acid.

For the disintegration of the bacterial cells and for the extraction of the anticarcinogen it is possible to use albumen and enzymes, without the enzymes participating in any chemical reaction with the active constituent. The enzymes simply help to eliminate the ballast materials which do not play any part in the anticarcinogenic action.

This process involves the use of albumen or of the lysozyme which it contains, pepsin and trypsin. The enzymes can be utilized successively in different combinations in accordance with the desired final result, and this is shown by examples 13 and 19 given below.

As far as the basic material is concerned, natural bacterial cells of the originating microorganism can be used, as also can lyophilized bacterial cells, dried degreased bacterial cells, bacterial cells which have been preliminarily treated to eliminate certain ballast elements, and also preparations of anticarcinogens obtained as a result of chemical purification.

The anticarcinogen obtained in the above-mentioned manner is characterized by the following properties;

1. The anticarcinogen is soluble in both neutral water and alkaline aqueous liquids, but precipitates out at a pH-value of less than 4.
2. The anticarcinogen is practically insoluble in organic solvents such as alcohol, acetone, ethyl acetate, ether, benzene, chloroform and petroleum ether.
3. The anticarcinogen cannot be dialyzed in water through a regenerated cellulose membrane (Cellophane).
4. The anticarcinogen loses its effectiveness if heated to a temperature of 120°C for 10 minutes in a neutral aqueous solution. In an alkaline solution it loses its effectiveness at room temperature.
5. The most characteristic property of the anticarcinogen is its biological anticarcinogenic effect. If an appropriate dose is injected intravenously into mice carrying well-developed intradermal sarcomas of the Krocker-type (sarcoma 180) or intradermal carcinomas of the d'Erlih-type, there is well-defined necrosis of the tumor in practically all cases and some days layer virtually half of the animals are completely cured.

These properties lead to the conclusion that the anticarcinogen is of a very complex molecular construction. It differs in its properties from all the anticarcinogens thus far known.

Numerous chemical analyses of the anticarcinogen have shown that it has a complex chemical composition and that it also contains a ribonucleic acid, the chemical and physical properties of which enable the anticarcinogen to be defined.

The ribonucleic acid which forms part of the anticarcinogen, contains besides sodium as salt, the following characteristic elements:

carbon — 33.35%
hydrogen — 4.43%
nitrogen — 13.70%
phosphorus — 9.80%

Figure 3:
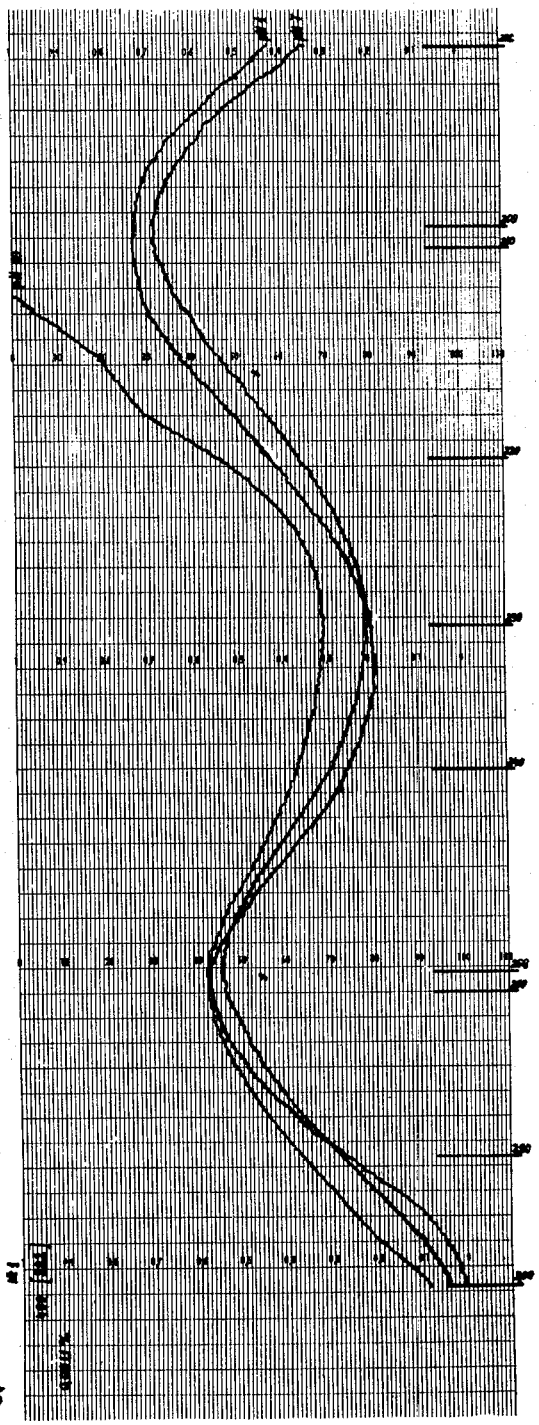
FIG. 3 is an infra-red spectrum of this ribonucleic acid.

This ribonucleic acid has an absorption peak at 258 millimicrons. Its ultra-violet spectrum is illustrated in FIG. 2 and its infra-red spectrum in FIG. 3.

After hydrolysis, a chromatographic examination of the carbonhydrates using a solvent system consisting of butanol, propanol, water in proportions of 1 : 1 : 1, revealed a pocket at RF 0.35 which corresponds to ribose.

The invention is illustrated by the following Examples:

Example 1

Lactobacillus bulgaricus of the tumoronecroticans LB-51 variety is inoculated in 200 ml of a nutritive medium including 3% of soya extract, 0.5% of peptone, 0.5% of meat extract, 0.5% of yeast extract, 0.5% of saccharose and 0.1% of magnesium sulphate. Cultivation is carried out at a temperature of 37°C for 24 hours. The pH-value of the culture is adjusted to 6.5 and the culture is then centrifuged at 5,000 g for 30 minutes.

The liquid (1) floating on the top is intravenously injected in an amount of 0.5 mm into mice carrying a well-developed subcutaneously implanted sarcoma 180. There is no necrosis of the tumor in any of the 20 mice treated. The sediment of the bacterial cells (2) is ground, together with some black sand, using a pestle and mortar and extracted using 100 mm of distilled water. The mixture is centrifuged at 5,000 g and the liquid (3) floating on top is intravenously injected into mice carrying the sarcoma 180, the dose being 0.5 mm. After 24 hours, a necrosis of the tumor was observed in 17 mice of the 20 treated and 10 days later 8 mice were completely cured.

Under the same experimental conditions, extracts of bacterial cells (3) obtained from Lactobacillus casei of the variety tumoronecroticans No. 17, led to the production of necroses in 14 mice of 20 treated, 4 of which were completely cured.

Extracts of Lactobacillus helveticus, of the variety tumoronecroticans No. 31, produced necroses in 15 mice of 20 treated, 5 being completely cured. Extracts of Lactobacillus acidophilus, of the variety tumoronecroticans No. 43, produced 12 necroses and 3 complete cures.

Example 2

Lactobacillus bulgaricus of the variety tumoronecroticans LB-51 is inoculated, in a nutritive medium consisting of 1,200 liters of the following composition: 3% soya extract, 0.5% meat extract, 0.5% peptone, 2% molasses (calculated as sugar), 0.1% of magnesium sulphate and 1,200 liters of tap water. The culture was cultivated at 37°C for 24 hours. The pH-value of the culture was set at 6.5 after which it was centrifuged. The sediment was rinsed with 50 volumes of physiological salt solution and centrifuged again. The product was 14,200 grams of moist natural bacterial cells.

5,000 grams of these bacterial cells are diluted with 15,000 milliliters of water and disintegrated in a homogenizer. The homogenized product is centrifuged at 5,000 g and the liquid (1) floating on the top is separated out. 10 milliliters of this liquid are diluted with distilled water until a concentration of 8 mg of the dry substance per milliliter is reached, and a dose of 0.5 ml. is then intravenously injected into mice carrying developed Krocker sarcomas. Well defined necrosis of the tumor occurred in 19 of the 20 mice treated, 12 of which were eventually completely cured.

100 milliliters of the liquid (1) floating on the top are lyophilized and a chemical analysis of the product had the following composition: nucleic acid 0.5% and proteins 70%.

Example 3

3,000 milliliters of the liquid (1) floating on the top, from Example 2, are added to 6,000 milliliters of 96% ethanol. The mixture is kept at 4°C for 2 hours and then centrifuged.

The liquid floating on the top is separated and the precipitate (3) is dissolved in 600 ml of water, then centrifuged to eliminate the insoluble residue. The pure solution (4) is split into three equal parts for subsequent processing.

200 milliliters of the solution (4) are acidified using hydrochloric acid until a pH-value of 2 is reached. The precipitate (5) is separated out by centrifuging. The liquid (6) floating on the top is also separated out. The precipitate is rinsed using ethanol and acetone and then dried. The product is 9.4 grams of dry material. 30 milligrams of this substance are dissolved in 15 milliliters of water and then intravenously injected into mice carrying 180 sarcomas, the dose being 0.5 milliliters. Necroses of the tumor appeared in 17 of the 18 mice treated, 10 mice eventually being completely cured. Analytical results indicated the presence of 13.7% of nucleic acid and 74% of proteins.

Example 4

200 milliliters of the solution (4) of Example 3, are mixed with ammonium sulphate until the saturation level of 0.4 is reached, and refrigerated for 2 hours at a temperature of 4°C. The mixture is centrifuged. The liquid floating on the top is separated out and the precipitate is diluted in 50 milliliters of water at a pH-value of 2, centrifuging then being carried out again. The liquid floating on the top is eliminated and the sediment dissolved in water, with the addition of soda to bring the pH-value to 7. The solution is subject to dialysis through Cellophane, using running water, the time of this part of the process being 18 hours. The dialyzed liquid is centrifuged to separate out a small undissolved residue, and is then lyophilized. The resulting product is 7.4 gr of dry substance. Examination of the anticarcinogenic action, carried out in the same fashion as in Example 3 showed the necrosis of the tumor to occur in all the 20 treated animals, 12 eventually being completely cured.

Example 5

To 200 milliliters of the solution (4) obtained in Example 3, there are added 2 milliliters of a solution of 20% calcium chloride. The precipitate (1) is separated out by centrifuging. The liquid (2) floating on the top is acidified, using hydrochloric acid, until a pH-value of 2 is reached. The new precipitate is separated out by centrifuging and the liquid (4) floating on the top is eliminated. The precipitate (3) is dissolved in water, soda being added to bring the pH-value to 7. It is then subjected to lyophilizing. The resulting product is 3.2 grams of dry substance. A dose of one milligram per mouse led to complete necrosis of the tumor in all the mice treated. Results of an analysis indicate the presence of 14.3% of nucleic acid and of 69% of proteins.

The precipitate (1) is diluted in 50 milliliters of water and 3 grams of "Amberlite" are added. The mixture is centrifuged and the liquid floating on the top is lyophilized. The resulting product is 7.4 grams of dry substance. A dose of this substance amounting to one milligram per mouse produced extremely marked necrosis of the tumor in all the 20 animals treated, 11 of which were completely cured.

The results of an analysis indicate the presence of 11.9% of nucleic acid and 70% of proteins.

Example 6

1,000 milliliters of the liquid (1) floating on the top, as obtained in Example 2, are acidified, using hydrochloric acid, to give a pH-value of 2. The precipitate is separated out by centrifuging and dissolved in 100 milliliters of water, soda being added to bring the pH-value up to 7. The solution is mixed with 2 volumes of 96% ethanol. The precipitate is separated out by centrifuging and then rinsed in ethanol and acetone, thereafter being dried. The resulting product is 7.2 grams of dry substance. A dose of 1 milligram per mouse produced a necrosis of the tumor in 20 of the animals treated, 13 of which were completely cured. The results of an analysis indicated the presence of 10.8% of nucleic acid and 74% of proteins in this substance.

Example 7

To 1,000 milliliters of the liquid (1) floating on the top, as described in Example 2, ammonium sulphate is added until the saturation level of 0.4 is reached. The precipitate is centrifuged and dissolved in water. The solution is acidified, using hydrochloric acid, until a pH-value of 2 is reached. The precipitate is dissolved in water, neutralized to give a pH-value of 7, and then lyophilized. The resulting product is 8.2 grams of dry substance. A dose of 1 milligram per mouse led to a necrosis of the tumor in all the 18 mice treated, 12 of which were eventually completely cured. The results of an analysis indicate 9.9% of nucleic acid and 77% of proteins as being present.

Example 8

To 1,000 milliliters of the liquid (1) floating on the top, as referred to in Example 2, there are added 10 milliliters of a 20% calcium chloride solution. The precipitate is centrifuged and dissolved in 100 milliliters of distilled water. To this suspension, 3 grams of "Amberlite" are added. After vigorous stirring, the mixture is centrifuged and the liquid floating on the top is lyophilized. The resulting product is 6.8 grams of dry substance. A dose of 1 milligram per mouse produced well-defined necrosis of the tumor in each of the 24 mice treated, 11 of which were eventually completely cured.

The results of an analysis indicate the presence of 12% of nucleic acid and 69% of proteins.

Example 9

500 milliliters of the liquid (1) floating on the top, as referred to in Example 2, are mixed with 500 milliliters of 90% phenol. The mixture is vigorously agitated for 1 hour at a temperature of 4°C, and centrifuged at 5,000 g for 30 minutes. The water and phenol phases are separated.

The water phase is acidified, using hydrochloric acid, until the pH-value of 2 is reached. The precipitate is separated out by centrifuging, rinsed with ethanol and acetone, and finally dried. 1.8 grams of dry substance are obtained. A dose of 2 milligrams per mouse produced necrosis of the tumor in only 12 of the 20 mice treated, only 5 of which were ultimately completely cured.

The phenol phase has sodium acetate added to it to give a concentration of 1% after which 4 volumes of ethanol are added. The precipitate is centrifuged, rinsed using ethanol and acetone, and then dried. The resulting product is 6.4 grams of dry substance. A dose of 1 milligram per mouse produced a necrosis of the tumor in the 20 animals treated, 12 of which were eventually completely cured.

The results of an analysis indicate the presence in this substance of 7.9% of nucleic acid and 84% of proteins.

Example 10

100 grams of moist natural bacterial cells, as obtained in Example 2, are mixed with 1,000 milliliters of freshly distilled 90% phenol. The mixture is agitated for 1 hour at a temperature of 10°C, and then centrifuged. The phenol layer is thereby separated. 100 milliliters of this have 1% sodium acetate added, plus 4 volumes of 96% ethanol. The precipitate obtained is centrifuged, rinsed using ethanol and acetone, and then dried. The resulting product is 3.2 grams of dry substance. A dose of 2 milligrams per mouse produced a necrosis of the tumor in the 20 mice treated, 9 of which were eventually completely cured.

Example 11

500 grams of the moist bacterial cells referred to in Example 2 are diluted with 1,000 milliliters of water and subsequently added to 1,000 milliliters of 90% phenol. The mixture is agitated for 1 hour at a temperature of 4°C and then centrifuged for 30 minutes at 5,000 g. The water phase (1) and the phenol phase (2) are separated.

1% of sodium acetate and then 2 volumes of ethanol, are added to the aqueous phase. The mixture is centrifuged. The liquid (2) floating on the top is eliminated. The precipitate (4) is dissolved in 50 milliliters of water with the addition of soda to bring the pH-value up to 7. The solution is then acidified using hydrochloric acid until a pH-value of 2 is reached. The mixture is centrifuged. The liquid (5) floating on the top is separated out and the precipitate (6) is dissolved again in 50 milliliters of water, soda being added, and the whole then acidified using hydrochloric acid until a pH-value of 2 is reached, whereupon centrifuging takes place. The liquid floating on the top is eliminated and the precipitate (8) is rinsed in ethanol and acetone, then dissolved in 20 milliliters of water with the addition of soda to bring the pH-value to 7, whereafter lyophilizing takes place. The resulting produce is 0.8 grams of dry substance. A dose of 1 milligram of this substance per mouse produces complete necrosis of the tumor in the 20 mice treated, only 5 being eventually completely cured, however.

The phenol phase (2) is precipitated using 4 volumes of ethanol. The precipitate is rinsed using ethanol and acetate, and subsequently dried. A dose of 1 milligram of this substance per mouse, produced necrosis of the tumor in the 22 mice treated, 10 of which were eventually completely cured.

Example 12

4,800 grams of moist natural bacterial cells of Lactobacillus bulgaricus LB-51, are diluted in 2,000 milliliters of albumen, a normal saline solution being added to bring the total volume of 14,000 milliliters. The suspension is brought to a temperature of 37°C and agitated continuously for 3 hours, after which the mixture (1) is acidified using hydrochloric acid, until a pH-value of 2 is reached.

To 1,000 milliliters of the mixture (1) there is added 1 gram of pepsin, the whole being continually mixed for 4 hours and maintained at a temperature of 37°C. Soda is then introduced to bring the pH-value to 7. One gram of trypsin "Difco" is then added. Treatment with the trypsin is continued for 12 hours at a temperature of 37°C, stirring being carried out continuously and chloroform being added.

500 milliliters of the last treated mixture are centrifuged at 8,000 rpm for 30 minutes. The sediment formed of incompletely absorbed residues (2) is rinsed in alcohol, and then dried. The result is 5 grams of dry substance. The liquid (3) floating on the top is mixed with an equal volume of alcohol. The precipitate obtained is centrifuged at 2,700 rpm for 15 minutes and it (4) is then dissolved in a small quantity of water and lyophilized. This gives 3,500 milligrams of dry substance. Analysis indicates the presence of 62% of proteins and 13.54% of nucleic acid.

Doses of 4 milligrams injected intravenously into mice having well-developed 180 sarcomas, produced profound necrosis in the tumors of the 10 animals treated.

The liquid (5) floating on the top is mixed with an equal volume of alcohol. A new precipitate is obtained. After centrifuging at 2,700 rpm for 15 minutes, the precipitate (6) is dissolved in a small quantity of water and then lyophilized. 3,300 milligrams of dry substance are obtained, analysis of which indicates 29% of proteins and 30.03% of nucleic acid.

A 4 mg dose injected intravenously into mice having well-developed 180 sarcomas, produced profound necrosis of the tumor in all the 10 animals treated.

Example 13

13,000 milliliters of the mixture (1) referred to in Example 12, are centrifuged at 8,000 rpm for 30 minutes. The liquid (1) floating on the top is separated off. The precipitate (2) is submitted to three successive degreasing operations using a mixture of equal volumes of alcohol and ether. After evaporation of the solvent, 544 grams of dry substance (3) are obtained.

Example 14

10 grams of the substance (3) referred to in Example 13, are diluted in 100 milliliters of a saline solution. After acidification of the mixture using hydrochloric acid to give a pH-value of 2, 100 milligrams of pepsin are added. The mixture is maintained at a temperature of 37°C for 4 hours, being agitated constantly. It is then centrifuged at 2,700 rpm for 15 minutes. The liquid (1) floating on the top is separated off. The precipitate (2) is dissolved in the initial volume of saline solution; then neutralized to a pH-value of 7, after which it is centrifuged at 8,000 rpm for 30 minutes. The precipitate (3) of the unabsorbed residues, is rinsed with alcohol and then dried. The resulting product is 3,900 milligrams of dry substance. The liquid (4) floating on the top is lyophilized. This gives 1,300 milligrams of dry substance, analysis of which indicated the presence of 88% of proteins and 10.09% of nucleic acid.

2 milligram doses injected intravenously into mice having well-developed 180 sarcomas produced profound necrosis of the tumour in 17 of the 20 animals treated. 10 days later, 9 of the animals were completely cured.

Example 15

10 grams of the substance (3) referred to in Example 13, are diluted in 100 milliliters of saline solution, the pH-value being adjusted to 7 and 100 milligrams of trypsin Difco being added. The mixture is brought to a temperature of 37°C and agitated vigorously for 4 hours, whereafter it is centrifuged at 2,700 rpm for 15 minutes. The precipitate of the unabsorbed residues (1) is rinsed in alcohol and then dried. The result is 2,550 milligrams of dry substance.

The liquid (2) floating on the top is mixed with an equal volume of alcohol. A voluminous precipitate results. The liquid (3) floating on the top is separated off after centrifuging, and the precipitate (4) is dissolved in water and then lyophilized. The product is 2,800 milligrams of dry substance, analysis of which indicates the presence of 92% of proteins and 7% of nucleic acid.

4 milligram doses injected intravenously into mice having well-developed 180 sarcomas, produced profound necrosis of the tumor in 18 of the 20 animals treated. 10 days layer, 10 animals were completely cured.

Example 16

10 grams of the substance (3) referred to in Example 13, are diluted with 100 milligrams of saline solution. The mixture is acidified using hydrochloric acid to give a pH-value of 2, and 100 milliliters of pepsin are added. After 4 hours of treatment at a temperature of 37°C the mixture is neutralized until a pH-value of 7 is obtained, 100 milligrams of trypsin Difco being added. The mixture is again maintained at 37°C for 4 hours and is centrifuged at 8,000 rpm for 30 minutes. The precipitate of the unabsorbed residues (1) is washed with alcohol and dried. 1,350 milligrams of dry substance are obtained.

The liquid (2) floating on the top is mixed with an equal volume of alcohol and centrifuged. The liquid (3) floating on the top is separated off. After dissolving in a little water, the precipitate is lyophilized. This yields 2,200 milligrams of dry substance, which analysis shows to contain 68% of proteins and 8.84% of nucleic acid.

A 2 milligram does injected intravenously into mice having well-developed 180 sarcomas, produced profound necrosis of the tumor in all the 20 animals treated and 10 days layer, 8 of the animals were cured.

Example 17

1500 milligrams of the fraction (5) of Example 14 are dissolved in 45 milliliters of saline solution, 15 milligrams of recrystallized trypsin being added. The mixture is maintained at a temperature of 37°C, being agitated constantly and the pH-value being preiodically corrected to 7. After a 20 hour treatment, the mixture is centrifuged. The precipitate (1) of unabsorbed material is separated out. The liquid (2) floating on the top has added to it sodium chloride until a concentration of 12% is reached. This produces sedimentation in the precipitate and the latter is centrifuged at 2,700 rpm for 30 minutes whereafter the precipitate (3) is dissolved in water and lyophilized. This yields 400 milligrams of dry substance, the analysis of which indicates the presence of 11% of proteins and 0.5% of nucleic acid.

Even an 8 milligram dose injected intravenously into mice did not produce any change in the tumor carried by the 20 mice treated.

Half the volume of alcohol is added to the liquid (4) floating on the top. The precipitate obtained is separated by centrifuging and then dissolved in a little water and lyophilized. This yields 120 milligrams of dry substance (5) analysis of which indicates the presence of 21% of proteins and 1.3% of nucleic acid.

A 4 milligrams dose injected intravenously into mice having well-developed 180 sarcomas produced profound necrosis of the tumor in 18 of the 20 animals treated and, 10 days later, 8 of the animals were completely cured.

Example 18

5 grams of lyophilized bacterial cells of the strain lactobacillus bulgarious LB-51 are diluted in 50 milliliters of saline solution the pH-value of which is 7.50 milligrams of lysozyme are added to the mixture. Treatment with the lysozyme is effected at a temperature of 37°C, agitation being carried out continuously for 2 hours. The mixture is acidified by adding hydrochloric acid until the pH-value of 2 is reached and 50 milligrams of pepsin are also introduced. After a 4 hour treatment at a temperature of 37°C, the mixture is centrifuged at 2,700 rpm for 30 minutes. The liquid floating on the top is separated out.

The precipitate (2) is dissolved in a saline solution of which the pH-value is 7.50 milligram of trypsin Difco are added. After a 4 hour treatment at 37°C, continuous agitation being carried out, the mixture is centrifuged at 2,700 rpm for 30 minutes. The precipitate of the unabsorbed residues (3) is washed in alcohol and dried. This yields 640 milligrams of dry substance.

The liquid (4) floating on the top is mixed with an equal volume of alcohol. After centrifuging the mixture, the precipitate (5) is dissolved in a little water and subjected to dialysis through a "Cellophane" membrane in running water, whereafter it is lyophilized. This produces 500 milligrams of dry substance, analysis of which indicates the presence of 37% of proteins and 11.36% of nucleic acid.

The liquid (6) floating on the top is mixed with an equal volume of alcohol and centrifuged. The precipitate (7), dissolved in a little water, is subjected to dialysis in running water for 24 hours and thereafter lyophilized. This produces 80 milligrams of dry substance, analysis of which indicates the presence of 29% of proteins and 41.24% of nucleic acid.

The precipitates (5) and (7), when administered in 4 milligram doses to mice, produced very marked necrosis of the tumor in the 20 mice treated.

What is claimed is:

1. A process for the manufacture of a microbial material containing ribonucleic acid which comprises the steps of cultivating Lactobacillus bulgaricus strain 51, in a nutritive medium containing as a nitrogen source a member of the group consisting of soybean extract, peptone, yeast extracts, maize extracts, meat extracts; as a carbon source a member of the group consisting of glucose, maltose, lactose, saccharose, dextrin, molasses; as a source of phosphorus, a member selected from the group consisting of organic and inorganic phosphates, under anaerobic conditions at a temperature between 28° and 50°C for a period of 18 to 24 hours, treating the resulting bacteria cells with albumin and at least one enzyme selected from the group consisting of pepsin and trypsin, extracting the obtained mass by phenol, and precipitating the active material from said extract.

2. A process as claimed in claim 1, wherein hydrochloric acid is added to the solution obtained in the extraction step until a pH-value between 1.5 to 4 is reached.

3. A process as claimed in claim 1 wherein said active material is precipitated from said extracts by the addition of at least one inorganic salt.

4. A process as claimed in claim 3, wherein said salt is selected from the group consisting of ammonium sulphate, sodium sulphate, barium chloride, calcium chloride, or magnesium sulphate and mixtures thereof in combination with hydrochloric acid.

* * * * *